United States Patent
Desantis et al.

(10) Patent No.: US 10,615,635 B1
(45) Date of Patent: Apr. 7, 2020

(54) ELECTRICAL CONNECTOR WITH RESERVE POWER SUPPORT

(71) Applicant: Amazon Technologies, Inc., Seattle, WA (US)

(72) Inventors: Peter Nicholas Desantis, Seattle, WA (US); Michael P. Czamara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 15/464,303

(22) Filed: Mar. 20, 2017

(51) Int. Cl.
| | |
|---|---|
| *H02J 9/06* | (2006.01) |
| *H02M 7/44* | (2006.01) |
| *H02J 7/00* | (2006.01) |
| *H01R 24/28* | (2011.01) |
| *H01R 24/20* | (2011.01) |
| *H01R 103/00* | (2006.01) |

(52) U.S. Cl.
CPC .............. *H02J 9/061* (2013.01); *H01R 24/20* (2013.01); *H01R 24/28* (2013.01); *H02J 7/0052* (2013.01); *H02M 7/44* (2013.01); *H01R 2103/00* (2013.01)

(58) Field of Classification Search
CPC ........ H02J 9/061; H02J 7/0052; H01R 24/20; H01R 24/28; H02M 7/44
See application file for complete search history.

(56) References Cited

U.S. PATENT DOCUMENTS

| | | | |
|---|---|---|---|
| 8,500,465 B1 | 8/2013 | Ross et al. | |
| 8,902,569 B1 | 12/2014 | Wishman et al. | |
| 9,203,184 B1 | 12/2015 | Hui | |
| 9,437,387 B1 | 9/2016 | Kaplan et al. | |
| 2003/0207603 A1* | 11/2003 | Potega ................... | H01R 24/58 439/218 |
| 2011/0148197 A1* | 6/2011 | Hernandez .............. | H02J 9/061 307/26 |
| 2011/0260555 A1* | 10/2011 | McGinley ............... | H02J 9/005 307/116 |
| 2012/0320572 A1* | 12/2012 | Fischer ................. | F21V 19/002 362/183 |
| 2013/0109205 A1* | 5/2013 | Oddsen ................ | H01R 25/006 439/106 |
| 2018/0278086 A1* | 9/2018 | Hall ........................ | H02J 3/005 |

\* cited by examiner

*Primary Examiner* — Jared Fureman
*Assistant Examiner* — Duc M Pham
(74) *Attorney, Agent, or Firm* — Robert C. Kowert; Kowert, Hood, Munyon, Rankin & Goetzel, P.C.

(57) ABSTRACT

A power cable includes electrical connectors at a first end and a second end of the power cable. The electrical connectors individually or collectively include a built-in reserve power source, such as batteries or supercapacitors, and a control circuit configured to provide power to one or more downstream devices from the reserve power source when power received at one or more of the electrical connectors of the power cable is interrupted. In some embodiments, an electrical connector includes one or more indicators configured to indicate a state of the electrical connector and/or display one or more indications in response to receiving a signal from an external source, such as a management system of a facility.

20 Claims, 10 Drawing Sheets

ELECTRICAL CONNECTOR WITH RESERVE POWER SUPPORT

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers.

In systems, such as computer networks, many electrical connectors are used to connect electrical devices to a power system and to connect electrical devices within a power system. In many systems multiple electrical connectors may connect to a common distribution panel, such as a rack power distribution panel.

From time-to-time it may be necessary for a technician to disconnect an electrical connector for a particular electrical device from a power source, for example to repair or relocate the electrical device. In some circumstances, a technician may inadvertently disconnect an electrical device other than an electrical device the technician intended to disconnect. For example, where multiple electrical devices are connected to a common power distribution panel, a technician may inadvertently disconnect an electrical device connected to the power distribution panel by disconnecting an electrical connector other than an electrical connector of an intended device that is to be disconnected. In such circumstances, power may be unexpectedly lost to electrical systems, such as computing devices, that receive power via the inadvertently disconnected electrical connector. Such unexpected losses of power may disrupt operations of a facility, such as a data center. Also, in some circumstances even short term disruptions in power may trigger one or more computer systems to re-start thus extending a duration of an interruption event due to inadvertently disconnecting power to one or more electrical devices.

Also, in some facilities power distributed to electrical devices may be temporarily interrupted for various other reasons. For example, a power system may be switched from a primary power source to a reserve power source, electrical power consumption of electrical devices connected to a power system may momentarily exceed a capacity of the power system to distribute power, maintenance being performed on an upstream component of a power system may cause a temporary power disruption, or other such events may cause power distributed to electrical devices connected to a power system to be temporarily interrupted. In such circumstances disruptions in power may trigger electrical devices, such as one or more computer systems, to re-start thus extending a duration of an interruption event.

Figure 1:
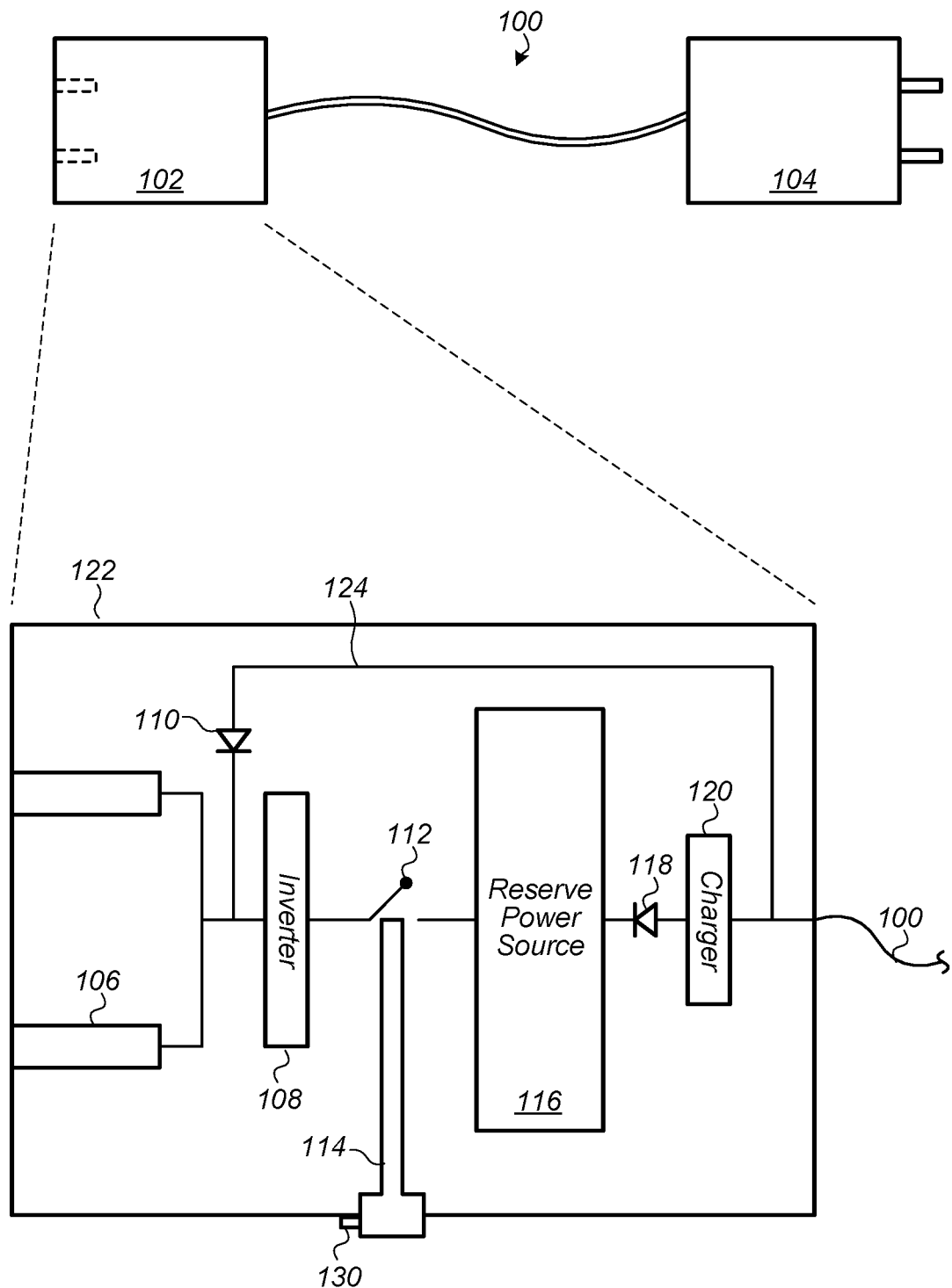
FIG. 1 illustrates an electrical connector that includes a reserve power source, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of electrical connectors with reserve power support and methods for providing reserve power via an electrical connector with reserve power support are described. According to one embodiment, a system includes an electrical power cable, an electrical connector coupled to a first end of the electrical power cable and another electrical connector coupled to a second end of the electrical power cable. The electrical connector coupled to the first end is configured to couple the cable to an electrical power source and the electrical connector coupled to the second end is configured to couple the cable to a device configured to receive electrical power transmitted via the cable. The electrical connector and the other electrical connector either individually or collectively comprise a reserve power source and a control circuit configured to provide electrical power to the device from the reserve power source in response to an interruption in power at the electrical connector or the other electrical connector. For example, the electrical power cable may be a cable that connects a computing device to a power panel via a power plug that couples into the power panel at a first end of the cable and a power receptacle that couples with the computing device at a second of the cable. In such an embodiment, a reserve power source, such as a battery, fuel cell, or supercapacitor, and a control circuit may be embedded in a casing of the power plug, the power receptacle, or integrated into the power plug and the receptacle.

According to one embodiment, a system includes an electrical connector configured to couple with an electrical power source or a device that receives electrical power. The electrical connector includes a control circuit, embedded in the electrical connector, configured to provide electrical power from a reserve power source in response to an interruption in power received at the electrical connector from the electrical power source.

According to one embodiment, a method of providing reserve power via an electrical connector with reserve power support comprises distributing electrical power received at an electrical connector to a downstream device coupled to the electrical connector from an electrical power source coupled to the electrical connector; and in response to an interruption in the electrical power received at the electrical connector from the electrical power source, feeding electrical power to the downstream device from a reserve power source included in a casing of the electrical connector or electrically coupled to the electrical connector via a connection separate from the electrical power source.

As used herein, a "cable" includes any cable, conduit, or line that carries one or more conductors and that is flexible over at least a portion of its length. A cable may include one or more electrical connectors, such as a plug or receptacle, at one or more of its ends.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to devices including a processor, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, a "plug" means any element or device on a cable that can be inserted into or couple with a connector receptacle to electrically connect the cable with another device or element.

As used herein, a "receptacle" means any element or device on a cable that can receive or couple with a connector plug, or a portion thereof to electrically connect the cable with another device or element.

As used herein, a "reserve power source" means any element or device that stores electrical power or that is configured to provide electrical power during an interruption of electrical power from a primary power source. For example, a reserve power source may include batteries, fuel cells, supercapacitors, a connection to a power source separate from a primary power source, or other such devices configured to provide power during an interruption in power being received from a primary power source.

In some circumstances electrical power may be temporarily interrupted at an electrical connector through which electrical power flows to one or more downstream devices that consume the electrical power. For example, an electrical connector may be inadvertently disconnected from a power source due to human error. Also, a disturbance in a power system upstream of an electrical connector may cause a temporary interruption in electrical power flowing through the electrical connector. For example an upstream power system may switch between power sources causing a temporary disruption in power. Also, some power systems may operate at or near a capacity of the power systems to distribute electrical power. Thus from time-to-time, a power load of the system may exceed a capacity of the power system and cause one or more interruptions in electrical power distributed by the power system. Also, in some circumstances electrical power received at an electrical connector may be temporarily interrupted intentionally. For example, an electronic device, such as a computing system, may need to be relocated. In such circumstances, an electrical connector may be disconnected to allow the electrical device to be moved to a new location causing a temporary interruption in electrical power received at an electrical connector associated with the electrical device.

In some embodiments, an electrical connector with reserve power support may provide electrical power to one or more electrical devices during interruptions in electrical power being received from a primary power source at the electrical connector. For example, in some embodiments, an electrical connector may include a reserve power source built into or connected to the electrical connector, such as a battery, fuel cell, or supercapacitor embedded in a casing of the electrical connector or connected through a casing of the electrical connector. The electrical connector may also include a control circuit that is configured to detect an interruption in electrical power being received from a primary power source at the electrical connector and in response to detecting the interruption, cause electrical power to be fed to a downstream electrical device from the reserve power source. In some embodiments, detection of an interruption of electrical power may be passive. For example, a control circuit of an electrical connector may include one or more diodes that automatically allow electrical power to be fed from a reserve power source when a voltage of power being received or failing to be received from a primary power source falls below a voltage level of the reserve power source. Thus, electrical power may continue to flow to a downstream electrical device despite an interruption in electrical power from a primary power source connected via the electrical connector. In addition, because the electrical connector may be located in a downstream location in an electrical power system, for example attached to a cable coupled to the electrical device, the electrical connector may remain connected to the electrical device despite an upstream component experiencing an interruption or inadvertently being disconnected. For example, an electrical connector with reserve power support may be integrated into a cable that is attached to an electrical device and may continue to provide electrical power from a reserve power source even when the cable for the electrical device is temporarily disconnected, for example by accident or otherwise.

In some embodiments, an electrical connector may include one or more indicators, such as lights or displays, that indicate a status of the electrical connector. For example, in some embodiments, one or more indicators of an electrical connector may provide a first indication when electrical power is flowing through the electrical connector and a reserve power source associated with the electrical connector is in a charged state. The one or more indicators, may provide another indication, for example a different colored light, when electrical power is being fed to one or more downstream devices from the reserve power source associated with the electrical connector. Furthermore, the one or more indicators may provide a different indication when electrical power is flowing through the electrical connector from a primary power source and the reserve power source is in a charging state or is not fully charged.

In some embodiments, one or more indicators of an electrical connector may, in addition to or instead of indicating a status of the electrical connector, provide an indication based on a signal received from an external device or system. For example, in some embodiments a central system may assist technicians in locating particular electrical connectors by causing an indicator of a particular electrical connector to provide a distinct indication that makes the electrical connector easy to distinguish from other electrical connectors. For example, in a data center multiple computing devices may be coupled to a common power distribution panel and a central system may cause a light of an electrical connector associated with a particular one of the computing devices to provide an indication so that a data center technician can disconnect the electrical connector associated with the particular computing device. Also, in some embodiments, if a data center technician disconnects an electrical connector associated with a computing device other than the particular computing device that is to be disconnected, an indicator of the electrical connector of the other computing device may provide a different indication that indicates to the data center technician that he or she has inadvertently disconnected the wrong computing device. In such circumstances a reserve power source embedded in the electrical connector associated with the other computing device may provide electrical power to the other computing device during a period of time from when the electrical connector was inadvertently disconnected until the electrical connector is reconnected.

In some embodiments, indicators included in electrical connectors may be used to verify electrical configurations. For example, signals may cause indicators to provide one or more indications that allow for an electrical path or connection to be verified in a facility.

FIG. 1 illustrates a cable with an electrical connector that includes a reserve power source, according to some embodiments.

Cable 100 includes an electrical connector 104 at a first end of the cable, for example an electrical plug end, and an electrical connector 102 at a second end of the cable, for example, an electrical receptacle end. FIG. 1 also illustrates components included in electrical connector 102. In some embodiments, a plug end of a cable may be coupled with an electrical power supply such as a power distribution unit, or may be coupled with other upstream power distribution components of a primary power system, such as automatic transfer switches, uninterruptible power supplies, floor power distribution units, etc. In some embodiments, a receptacle end of a cable may be coupled with one or more downstream loads. For example a receptacle end of cable may directly couple to a computing device such as a server or piece of networking equipment. Also, a receptacle end of a cable may cable with one or more downstream components in a power system such as a rack power distribution unit or in some cases a floor power distribution unit. For example, electrical connector 104 on a plug end of cable 100 is configured to couple with upstream power components and electrical connector 102 on a receptacle end of cable 100 is configured to couple with downstream loads, such as a server or networking device. In some embodiments, the components shown in electrical connector 102 may be included in an electrical plug, such as electrical connector 104 or may be distributed between a plug and receptacle of a cable. As used herein, an "electrical connector" may refer to either a plug or a receptacle.

Electrical connector 102 includes casing 122 that includes receptacle portions 106 that are configured to accept pins of a corresponding electrical plug or pins of an electrical device that receives electrical power from cable 100. For example the electrical device may be a computing device wherein cable 100 functions as a power cable for the computing device. Electrical connector 102 is also connected to cable 100 at another end of the electrical connector 102. Electrical connector 102 includes reserve power source 116 embedded in casing 122 of electrical connector 102 and also includes charger 120 configured to charge reserve power source 116. In addition, electrical connector 102 includes inverter 108 configured to covert direct current (DC) power fed from reserve power source 116 into alternating current (AC) power that is to be fed to one or more downstream devices coupled with electrical connector 102 via receptacle portions 106. In some embodiments, an electrical connector, such as electrical connector 102, may further include one or more backflow prevention devices, such as diodes 110 and 118 and an override button such as override button 114. An override button may cause a switch or relay to open, such as switch 112, such that power is not fed from a reserve power source while the override button is depressed or the override is engaged. Additionally, an electrical connector, such as electrical connector 102, may include a control circuit, such as control circuit 124. A control circuit may be configured to cause electrical power to be fed to one or more downstream electrical devices from a reserve power source in response to an interruption in power being received at the electrical connector from a primary power source. For example, the arrangement of reserve power source 116 and diodes 118 in control circuit 124 may be such that when a voltage of electrical power received from a primary power source via cable 100 falls below a particular voltage, electrical power is fed from reserve power source 116.

In some embodiments, electrical connector 104 of cable 100 may couple with a power source that provides electrical power that flows through cable 100 to one or more electrical devices coupled downstream of electrical connector 102 of cable 100. An electrical power source coupled to electrical connector 104 may be referred to as a primary power source in relation to a reserve power source included in an electrical connector or coupled with an electrical connector, such as reserve power source 116. Under normal operating conditions, electrical power may flow from a primary power source through electrical connector 104, cable 100, and control circuit 124 of electrical connector 102 to one or more loads coupled downstream of cable 100 and electrical connector 102.

During an interruption in flow of electrical power from a primary power source, electrical power may be fed to one or more loads downstream of cable 100 and electrical connector 102 from a reserve power source, such as reserve power source 116. In some embodiments, an electrical connector may include a back-flow prevention device to prevent electrical power from reserve power source 116 from back flowing through cable 100 to upstream components of a power system. For example, electrical connector 102 includes diodes 110 and 118 to prevent backflow. In some embodiments, switches, fuses, relays or other types of devices may be used in place of or in addition to diodes to prevent backflow and/or isolate an upstream power source connected to cable 100 when electrical power is being fed from a reserve power source, such as reserve power source 116. For example, in some situations, electrical power from a primary power source coupled to electrical connector 104 may flow at a diminished rate or voltage. In some embodiments, an electrical connector, such as electrical connector 102, may further include one or more switches or relays that open to prevent diminished power from a primary power source from being mixed with power from a reserve power source, such as reserve power source 116. This may prevent issues caused by mixing non-matching phase angles of power from multiple sources. Also, in some embodiments, diminished power from a primary power source may have one or more characteristics that may be detrimental to downstream electrical devices such that it is necessary to isolate the downstream electrical devices from the diminished power from the primary power source to protect the downstream electrical devices. This may be done while feeding electrical power to the downstream electrical devices from a reserve power source, such as reserve power source 116.

In some embodiments, an electrical connector with reserve power support may provide alternating current electrical power to downstream electrical devices from a reserve power source. For example, an electrical connector, such as electrical connector 102, may include an inverter, such as inverter 108, downstream of a reserve power source, such as reserve power source 116. An inverter, such as inverter 108, may convert direct current (DC) power fed from a reserve power source, such as reserve power source 116, into alternating current (AC) power.

In some embodiments, an electrical connector with reserve power support, may further include a charger, such as charger 120. A charger may convert alternating current (AC) power from a primary power source into direct current (DC) power and may further condition the power such that the power is stored in a reserve power source, such as reserve power source 116. In some embodiments, a reserve power source, such as reserve power source 116, may include batteries, such as Lithium Ion batteries, or other suitable types of batteries and a charger, such as charger 120, may charge the batteries of the electrical connector. In some embodiments, a reserve power source, such as reserve power source 116, may include supercapacitors, and a charger, such as charger 120, may charge the supercapacitors. In some embodiments various other energy storage devices may be used as a reserve power source, such as reserve power source 116. As discussed in more detail in regard to FIG. 3, in some embodiments a reserve power source may be shared by multiple electrical connectors, such as electrical connector 102. In some embodiments, a reserve power source may store sufficient power to provide electrical power to downstream loads during a power interruption event with a duration of multiple power cycles. For example, in some embodiments a reserve power source may store sufficient amounts of electrical power to provide power to downstream loads for 25 milliseconds or more when power from a primary power source is interrupted. In some embodiments, a reserve power source may provide power to downstream loads for other amounts of time.

In some embodiments, an electrical connector comprising a reserve power source, such as a battery, fuel cell, or supercapacitor, embedded in an electrical connector may be configured such that the battery, fuel cell, or supercapacitor may be periodically changed out. For example, an electrical connector may include one or more fasteners such as screws that couple together portions of the electrical connector within which a reserve power source is mounted. In some embodiments, an electrical connector may be configured such that a reserve power source included in the electrical connector is hot swappable. For example, portions of a control circuit such as control circuit 124 may be sufficiently separated and/or insulated from a reserve power source, such as reserve power source 116, such that the reserve power source can be replaced with electrical power flows through the electrical connector.

In some situations, it may be desirable to override a reserve power support function of an electrical connector in order to stop power flow to a downstream electrical device. For example, in some situations it might be desirable to immediately cut off power flow to an electrical device, such as a computer system. In order to provide this capability, in some embodiments, an electrical connector, such as electrical connector 102, may include an override button, such as override button 114. In some embodiments, an override button may cause power to stop being fed from a reserve power source prior to the reserve power source being drained of charge. For example, in some embodiments, depressing an override button, such as override button 114, may cause one or more switches or relays to open, such as switch 112. In some embodiments, an override feature may not require a button to be depressed, but may be configured to be engaged remotely in response to receiving a signal to override a reserve power support function of an electrical connector. In some embodiments, an override button, such as override button 114, may further include a detent mechanism or latch that allows the override button to be configured to override a reserve power system even when not being depressed. For example, in some situations an operator of a data center may desire to opt out of a reserve power feature of an electrical plug or cable with reserve power support. For example, the operator may desire than electrical power not be fed to downstream devices in response to an interruption of electrical power. In such situations, an operator of a data center may engage a detent mechanism or latch of an override button, such as latch 130, to disable a reserve power support feature of an electrical connector or cable with reserve power support.

In some embodiments, an electrical connector, such as electrical connector 102 may be configured to couple directly with an electrical device, such as a computing system. For example, electrical connector 102 may be a receptacle that couples with a power input of a computing device. Since, reserve power is included in the electrical connector, an inadvertent disconnection of one or more elements in a primary power source that feeds electrical power to the computer system will not prevent electrical power from being fed to the computer system from electrical connector 102 that is directly coupled with the computer system.

In some embodiments, various components that provide reserve power support, such as the components illustrated in electrical connector 102 of FIG. 1, may be included in an electrical connector at a first end of a cable and in an electrical connector at a second end of a cable. In such embodiments, a cable may be considered a cable with integrated reserve power support.

Figure 2:
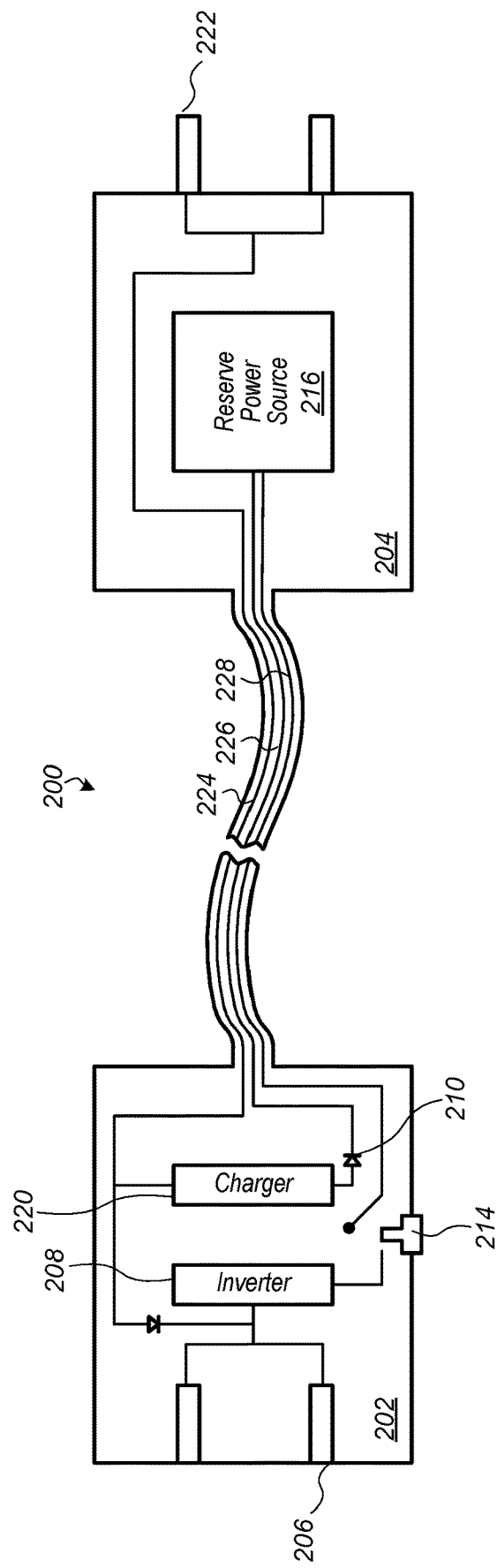
FIG. 2 illustrates a power cable with an integrated reserve power source, according to some embodiments.

For example, FIG. 2 illustrates a cable with integrated reserve power support, according to some embodiments. Cable 200 includes electrical connector 202 at a first end of the cable and electrical connector 204 at a second end of the cable. Electrical connector 204 includes pins 222 configured to couple with a power receptacle of a power system that functions as a primary power source for cable 200. When coupled to a primary power source, electrical power flows through pins 222 and wire 224 to charger 220 and receptacle portions 206 of electrical connector 202. During normal operation, power flows through cable 200 via wire 224 from pins 222 of electrical connector 204 to receptacle portions 206 of electrical connector 202. Also a portion of the power flowing though wire 224 may charge a reserve power source, such as reserve power source 216, via a charger, such as charger 220. In order to charge the reserve power source, the portion of the power from wire 224 that flows through charger 220 may subsequently flow to reserve power source 216 via an additional wire, such as wire 226, that connects charger 220 and reserve power source 216.

In response to an interruption in power from a primary power source, electrical power may flow from a reserve power source, such as reserve power source 216, to receptacle portions of an electrical connector, such as receptacle portions 206 of electrical connector 202, via an additional wire, such as wire 228. In some embodiments, electrical power from a reserve power source may be converted to alternating current (AC) power via an inverter, such as inverter 208 included in a path of wire 228. In some embodiments, a cable with integrated reserve power support, such as cable 200, may include an override button such as override button 214. An override button, such as override button 214, may function in a similar manner as override button 114 described in FIG. 1. In some embodiments wires 224, 226, and 228 may be included in a common wire insulation and appear to a user of cable 200 as a single cable.

In some embodiments, an electrical connector with reserve power support may be coupled to a shared reserve power source that is shared by more than one electrical connector with reserve power support. In some embodiments, inverter 208, charger 220, override button 214, and reserve power source 216 may be distributed across electrical connector 202 and 204 in various combinations. For example, in some embodiments, reserve power source 216 may be included in electrical connector 202 and one or more of inverter 208 and charger 220 may be included in electrical connector 204.

Figure 3:
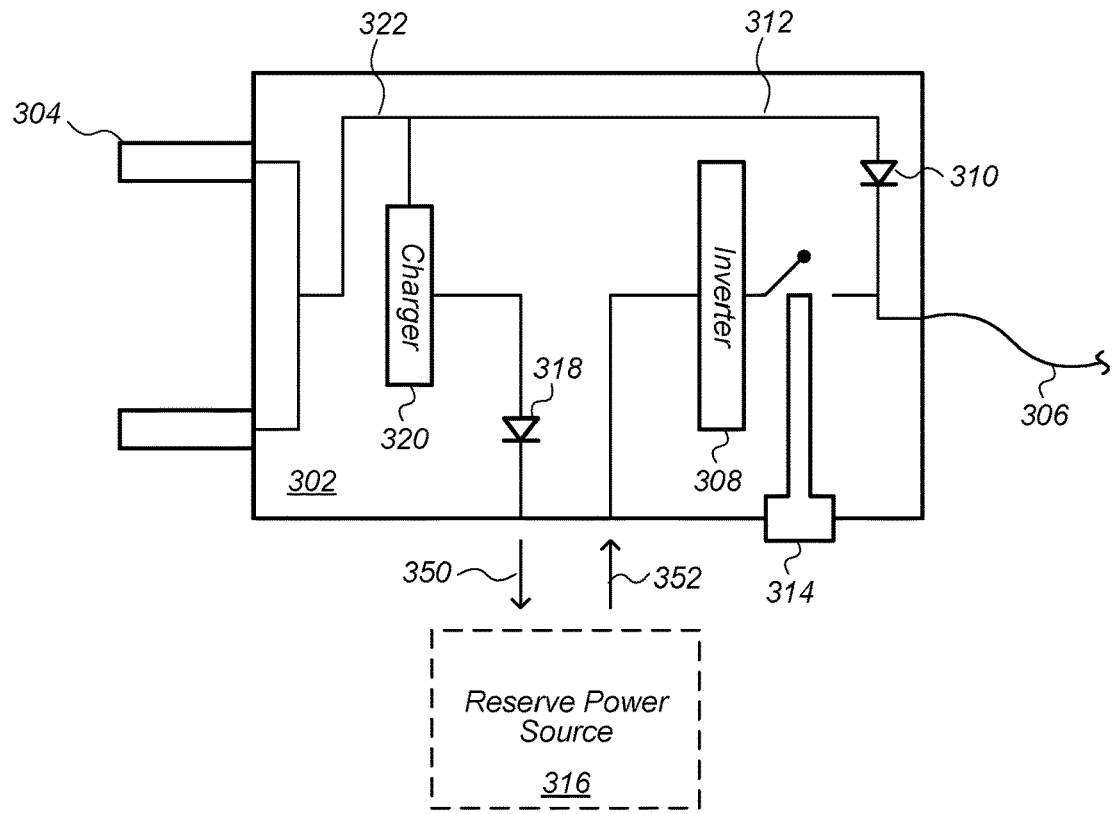
FIG. 3 illustrates an electrical connector configured to couple with an external reserve power source, according to some embodiments.

For example, FIG. 3 illustrates an electrical connector configured to couple with an external reserve power source, according to some embodiments. Electrical connector 302 includes pins 304 configured to insert into a corresponding electrical receptacle connected to a primary power source. Electrical connector 302 is also coupled with cable 306, which is configured to transmit electrical power received at electrical connector 300 to one or more downstream electrical devices. Note that electrical connector 302 is an electrical plug, whereas electrical connector 102 illustrated in FIG. 1 is an electrical receptacle. This is worth noting because in some embodiments components that provide reserve power support may be included in either a plug end or a receptacle end of a power cable or both.

During normal operation, electrical power flows into electrical connector 302 via pins 304 and flows out of electrical connector 302 via cable 306. In some circumstances, electrical power may also flow through a charger, such as charger 320 to charge a reserve power source, such as reserve power source 316. However, in contrast to reserve power source 116 illustrated in FIG. 1, in some embodiments a reserve power source, such as reserve power source 316, may be external to a casing of an electrical connector, such as electrical connector 302, and may be coupled with a power flow path through an electrical connector, such as power flow path 312 of control circuit 322 through electrical connector 302, via one or more connections, diodes, switches, relays etc. of the control circuit. In the embodiment shown in FIG. 3, reserve power source 316 is electrically coupled to charger 320 via a connection that includes a backflow prevention device 318. Also, reserve power source 316 is electrically coupled to inverter 308 that is in turn electrically coupled to an outlet from electrical connector 302 via cable 306. In some embodiments, an electrical connector, such as electrical connector 302, may include an additional backflow prevention device, such as backflow prevention device 310, to prevent electrical power fed from reserve power source 316 from back feeding into a primary power source coupled to electrical connector 302 via pins 304. Also, in some embodiments, an electrical connector, such as electrical connector 302, may include an override button, such as override button 314.

In some embodiments, an external reserve power source, such as reserve power source 316, may be coupled to an electrical connector, such as electrical connector 302, via a cable attached to the electrical connector. For example paths 350 and 352 may be included in a cable that couples electrical connector 302 with reserve power source 316. In some embodiments, an electrical connector, such as electrical connector 302, may include one or more ports for connecting a cable that includes paths 350 and 352. In some embodiments a cable that includes paths 350 and 352 may be permanently attached to an electrical connector, such as electrical connector 302, without ports that allow the cable to be coupled and uncoupled from the electrical connector.

In some embodiments, an electrical connector with power support or a cable with integrated power support may be used at various locations within a power distribution system, such as a power distribution system of a data center. Also, in some embodiments, a shared reserve power source may be used to provide reserve power support for a power distribution system, such as a power distribution system of a data center.

Figure 4:
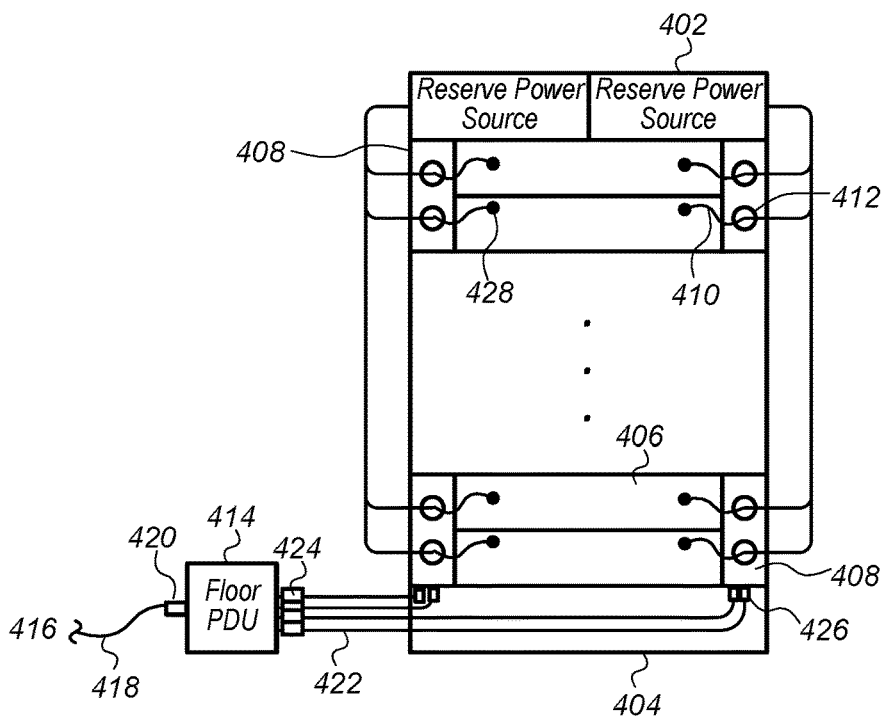
FIG. 4 illustrates a rack comprising multiple computing devices with electrical connectors coupled to shared external reserve power sources, according to some embodiments.

FIG. 4 illustrates a rack that may be included in a data center comprising multiple computing devices with electrical connectors coupled to shared external reserve power sources, according to some embodiments. Rack 404 includes reserve power sources 402, computing devices 406 connected to power distribution panels 408 via cables 410 and electrical connectors 412 and 428. Power is fed to floor power distribution unit 414 from a primary power source 416. Cable 418 and electrical connector 420 connect primary power to floor power distribution unit 414. Also cables 422 connect floor power distribution unit 414 to power distribution panels 408 via electrical connectors 424 and 426. Any of the electrical connectors shown in FIG. 4 such as electrical connectors 420, 424, 412, 426 or 428 may be electrical connectors with reserve power support as described in FIGS. 1-3.

Also, an external reserve power source such as reserve power source 316 illustrated in FIG. 3, may provide reserve power support to multiple electrical connectors, such as reserve power sources 402 mounted in rack 404 that are connected to electrical connectors 412. In some embodiments, a shared reserve power source, such as reserve power source 402, may be oversubscribed. For example one or reserve power sources 402 may store a sufficient amount of reserve power to support an interruption in power in one or more of computing devices 406, but may not store a sufficient amount of reserve power to support an interruption in all or nearly all of computing devices 406 that takes place at the same time. While, reserve power sources 402 are shown mounted at a top of rack 404, in some embodiments an external shared reserve power source may be mounted in various locations within a rack, adjacent to a rack, or remote from a rack. In some embodiments, one or more reserve power sources, such as reserve power sources 402, may be electrically coupled together to extend an amount of time for which the reserve power sources may provide reserve power.

In some embodiments, an electrical connector may include one or more indicators, such as colored lights or displays, configured to display a state of the electrical connector or display an indication in response to receiving a signal.

Figure 5:
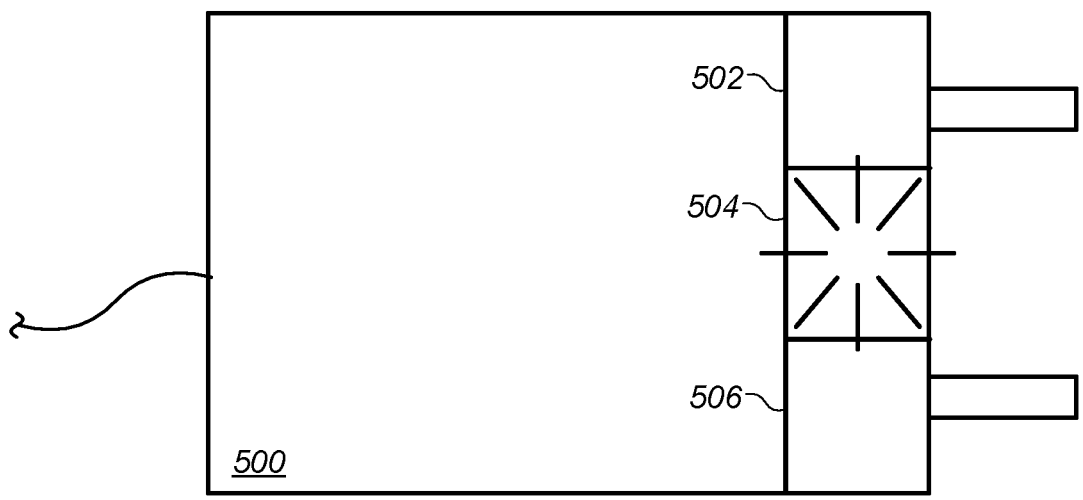
FIG. 5 illustrates an electrical connector that includes a reserve power source and indicator lights, according to some embodiments.

For example, FIG. 5 illustrates an electrical connector that includes a reserve power source and indicator lights, according to some embodiments. Electrical connector 500 may include components similar to the electrical connectors described in FIGS. 1-4 that provide reserve power support. In addition or alternatively, electrical connector 500 includes indicators 502, 504, and 506. In some embodiments, indicators 502, 504, and 506 may be colored lights. For example indictor 502 may be a green colored light, indicator 504 may be a yellow colored light, and indicator 506, may be a red colored light. In some embodiments, various other colors of lights or other types of indicators, such as digital displays, may be used. In some embodiments, when in a normal condition, for example no-interruption in power from a primary power source and a fully charged reserve power source, an indicator of an electrical connector may provide a first indication, for example a green light. When electrical power from a primary power source is interrupted and electrical power is being fed from a reserve power source, an indicator of an electrical connector may provide a second indication, for example a red light. Also, when electrical power is not interrupted from a primary power source, but a reserve power source is not yet charged, an indicator of an electrical connector may provide a third indication, for example a yellow light. For example, in FIG. 5 indicator 504 is illuminated and may indicate that a reserve power source associated with or included in electrical connector 500 is being charged but not yet fully charged. In some embodiments, an electrical connector may include a display that is configured to display textual messages such as "normal", "charging", "reserve", etc. In addition to or instead of indicating a status of a reserve power source, e.g. normal, charging, feeding from reserve, etc., one or more indicators of an electrical connector, such as indicators 502, 504, and/or 506, may indicate a state of a reserve power source, for example, whether or not the reserve power source is failed. For example, in some embodiments, one or more of indicators 502, 504, or 506 may be configured to provide an indicator, such as a blinking pattern, in response to a failure of a reserve power source.

In some embodiments, an electrical connector may include an interface configured to receive signals from an external device and in response provide one or more indications via indicators of the electrical connector.

Figure 6:
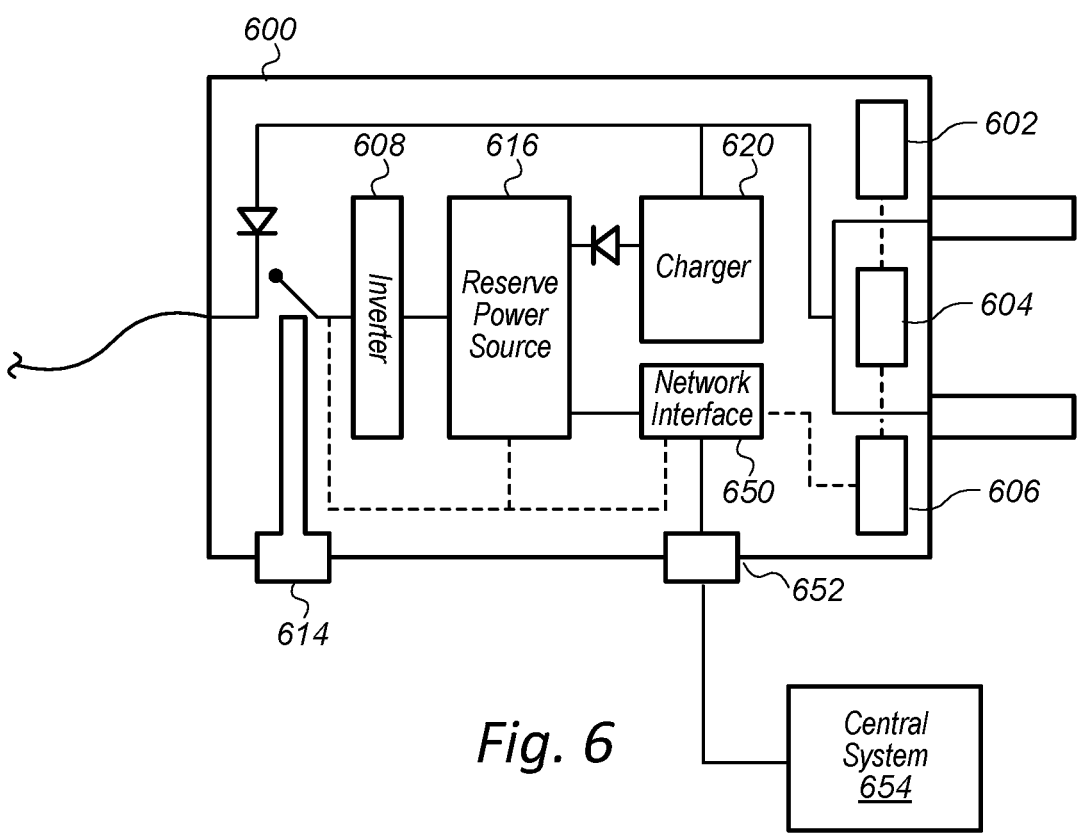
FIG. 6 illustrates an electrical connector that includes a reserve power source and indicator lights that is configured to receive signals via a network, according to some embodiments.

For example, FIG. 6 illustrates an electrical connector that includes a reserve power source and indicator lights that is configured to receive signals via a network, according to some embodiments. Electrical connector 600 includes an inverter 608, reserve power source 616, charger 620, override button 614, and indicators 602, 604, and 606 that function in a similar manner as corresponding components described in FIGS. 1-5. In addition, electrical connector 600 includes network interface 650 and network port 652. In some embodiments, network interface 650 may be connected to a central system, such as a data center building management system, via network port 652. In some embodiments, a central system may be an electrical power monitoring system. In some embodiments, a central system, such as central system 654, may send one or more signals to electrical connector 600 instructing the electrical connector to display one or more indications. For example, a central system may send a signal instructing electrical connector 600 to flash one or more of indicators 602, 604, or 606 to distinguish the electrical connector from other electrical connectors in a common location such that the electrical connector is easier for a technician to identify.

In some embodiments, a central system, such as central system 654, may remotely control one or more aspects of an electrical connector. For example, a central system, such as central system 654, may remotely cause an override, such as override 614, to prevent electrical power from being fed from a reserve power source. Also, in some embodiments, a network interface may communicate a reserve power source charge or remaining capacity to a central system, such as central system 654. In some embodiments, an electrical connector may include a display configured to display textual messages and the electrical connector may receive textual message to display on the display via a network interface, such as network interface 650. In some embodiments, a central system, such as central system 654, may send the textual messages to the electrical connector to be displayed on the display of the electrical connector.

Figure 7:
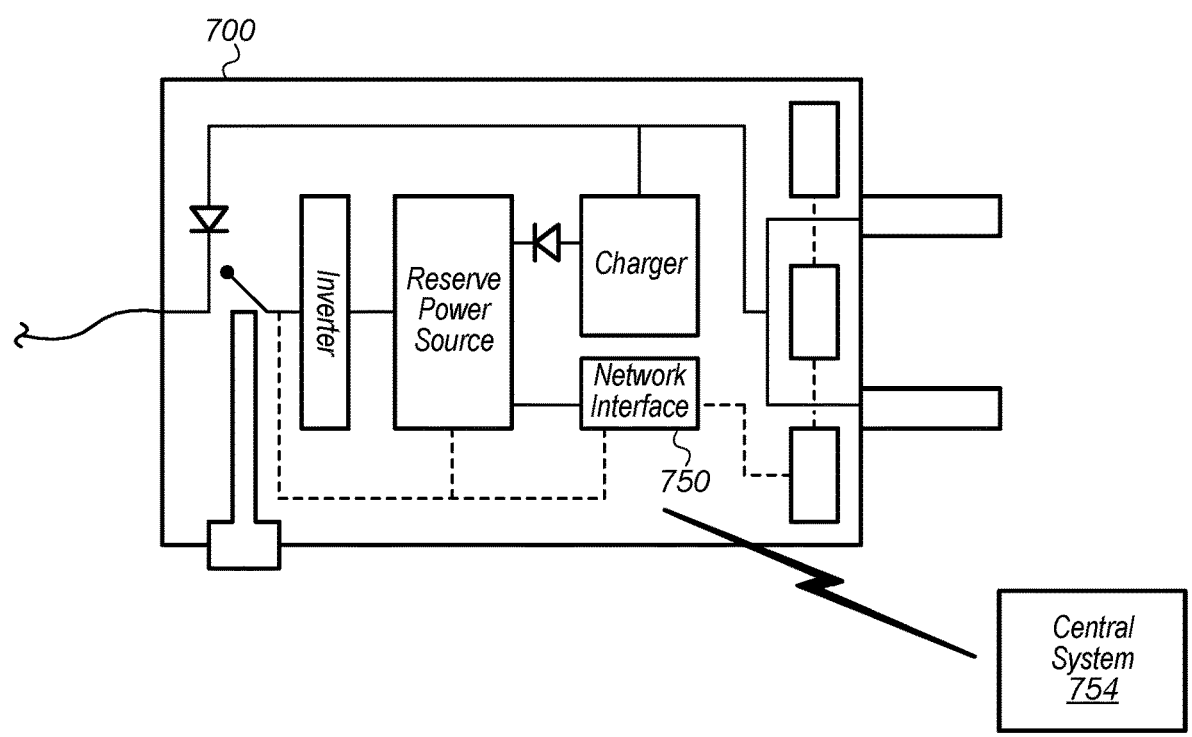
FIG. 7 illustrates an electrical connector that includes a reserve power source and indicator lights that is configured to connect to a wireless network, according to some embodiments.

In some embodiments, an electrical connector may include a network interface configured to receive wireless signals from a central system, such as a building management system. For example, FIG. 7 illustrates an electrical connector that includes a reserve power source and indicator lights that is configured to connect to a wireless network, according to some embodiments. Electrical connector 700, may be a similar electrical connector as electrical connector 600, except instead of a wired-connection to a central system, electrical connector may be configured to receive communications from a central system, such as central system 754 wirelessly. For example, network interface 750 may include a Wi-Fi interface or other suitable wireless communication interface to enable network interface 750 to receive wireless communications.

Figure 8:
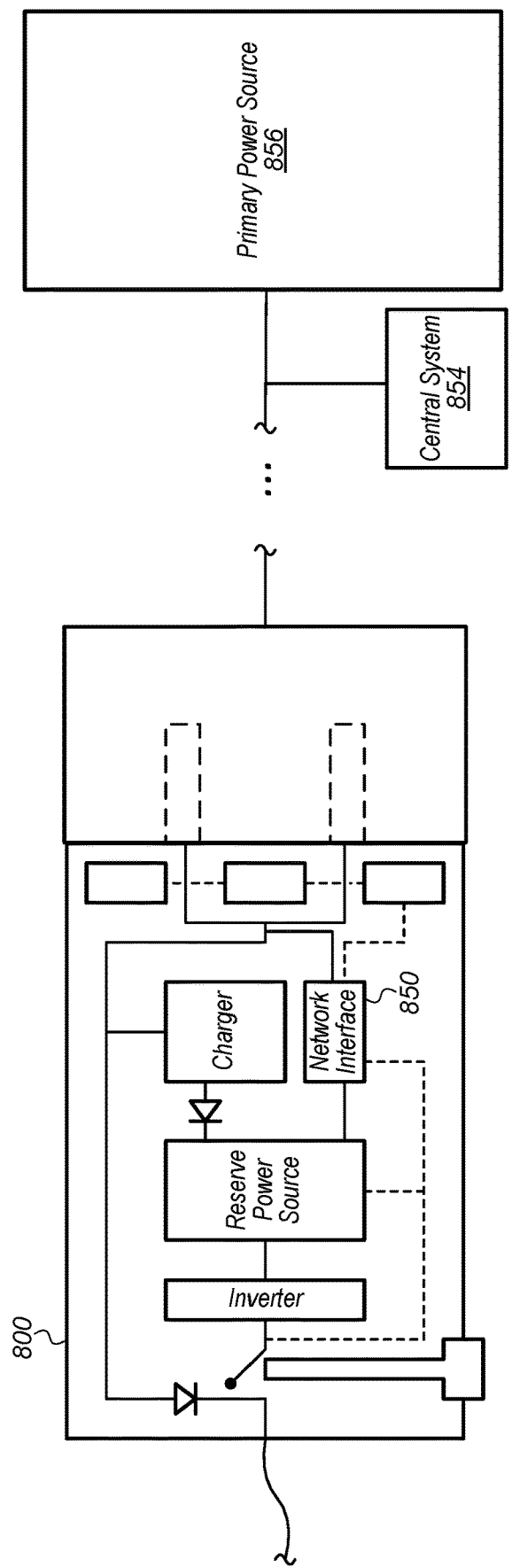
FIG. 8 illustrates an electrical connector that includes a reserve power source and indicator lights that is configured to receive signals transmitted via a connection to a primary power source, according to some embodiments.

In some embodiments, an electrical connector may receive signals transmitted through a power system or power line that provides primary power to the electrical connector. For example a signal may be transmitted by voltage or current variations in primary power at frequencies other than an alternating current transmission frequency. For example, FIG. 8 illustrates an electrical connector that includes a reserve power source and indicator lights that is configured to receive signals transmitted via a connection to a primary power source, according to some embodiments. Central system 854 may modulate a signal on top of electrical power being fed from primary power source 856 and network interface 850 may include one or more components, such as power filters, configured to filter out transmitted signals included in primary power and/or detect the signals in the primary power. For example, a central system, such as central system 854, may be configured to modulate signals at a particular frequency or set of frequencies and network interface 850 may include one or more components configured to filter primary power received at electrical connector 800 at the particular frequencies to discern signals transmitted from central system 854.

Figure 9:
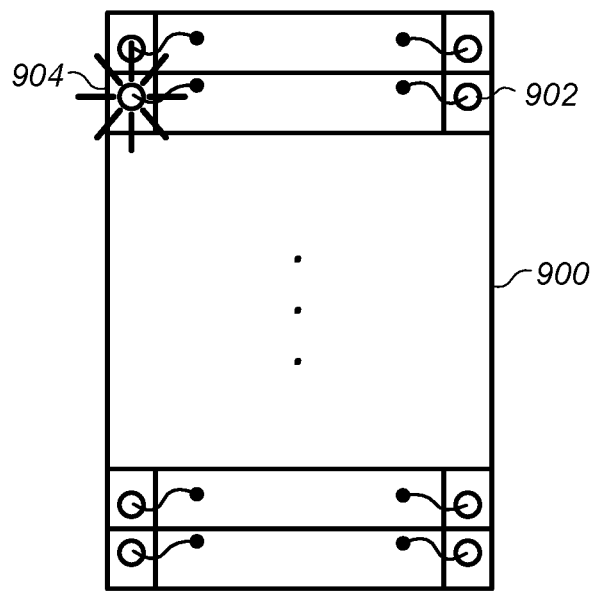
FIG. 9 illustrates an indicator of a particular electrical connector providing an indication that distinguishes the particular electrical connector from other electrical connectors associated with a rack, according to some embodiments.

In some embodiments, signals transmitted from a central system, such as a building management system, may allow a technician to more easily locate an electrical connector in a data center. For example, FIG. 9 illustrates an indicator of a particular electrical connector providing an indication that distinguishes the particular electrical connector from other electrical connectors associated with a rack, according to some embodiments. Rack 900 includes multiple electrical connectors 902, and an indicator 904 of a particular one of the electrical connectors 902 is illuminated. The indicator 904 may be illuminated in response to a signal from a central system and the illumination of indicator 904 may help a technician locate the particular electrical connector 902 associated with the illuminated indicator 904.

Figure 10:
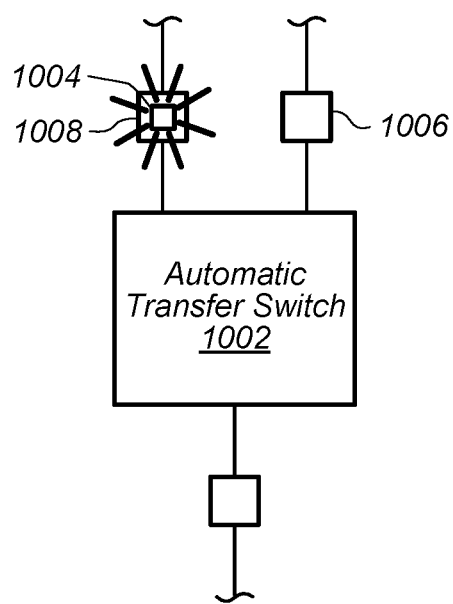
FIG. 10 illustrates an indicator of a particular electrical connector providing an indication that indicates a location of the connector in relation to a switch, according to some embodiments.

In some embodiments, signals transmitted from a central system, such as a building management system, may allow a technician to verify a power configuration of one or more components in a facility. For example, FIG. 10 illustrates an indicator of a particular electrical connector providing an indication that indicates a location of the electrical connector in relation to a power switch, according to some embodiments. In some embodiments, a power switch, such as an automatic transfer switch 1002, may be infrequently operated. During installation there is a risk that both sides of an automatic transfer switch may be inadvertently connected to a primary power system instead of one side being connected to a primary power system and one side being connected to a secondary power system. In some embodiments, a central system may send a signal through a secondary power system instructing indicators of electrical connectors connected to the secondary power system to provide a particular indication. A technician may then inspect switch connections to ensure that at least one of the sides of a switch is connected to the secondary power system. For example, in FIG. 10 indicator 1004 of electrical connector 1008 may indicate that electrical connector 1008 is connected to a secondary power system in response to a central system sending one or more signals through the secondary power system. For example, a central system may modulate a signal through a secondary power system in a similar manner as described in regard to central system 854 in FIG. 8. A similar test may be performed to determine that electrical connector 1006 is connected to a primary power system. Performing such tests may allow data center operators to proactively identify and correct connections to switches wherein an incorrect power system was inadvertently connected to the switch.

Figure 11A:
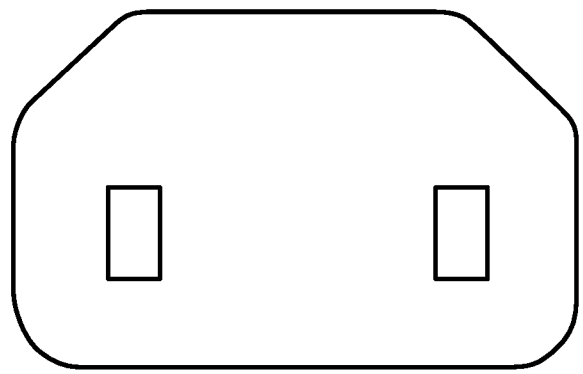
FIGS. 11A-C illustrate example configurations of electrical connectors with reserve power support, according to some embodiments.
Figure 11B:
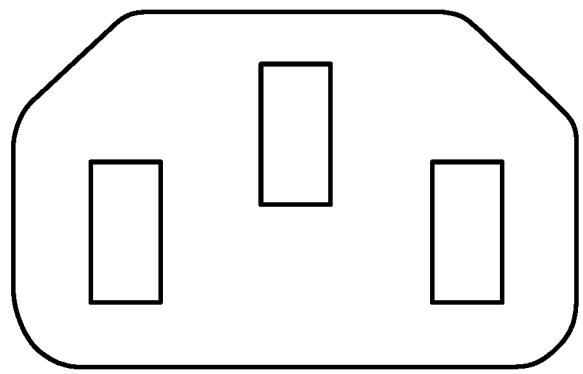
Figure 11C:
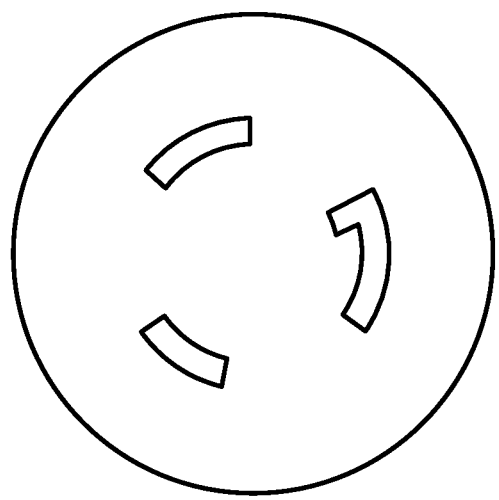

FIGS. 11A-C illustrate example configurations of electrical connectors with reserve power support, according to some embodiments. In some embodiments, an electrical connector may have a configuration in accordance with one or more standards, such as an International Electrotechnical Commission (IEC) standard. For example FIG. 11A illustrates an electrical connector with a C18 plug/receptacle configuration in accordance with IEC standard 60320 for appliance couplers for household and similar general purposes. As another example, FIG. 11B illustrates an electrical connecter with a C13 plug/receptacle configuration in accordance with IEC standard 60320. In some embodiments, an electrical connector with reserve power support may comply with one or more other standards for electrical plugs/receptacles. In some embodiments, an electrical connector may conform to a National Electrical Manufacturers Association (NEMA) standard. For example, FIG. 11C illustrates an electrical connector with a L6-30 plug/receptacle configuration in accordance with a NEMA standard.

Figure 12:
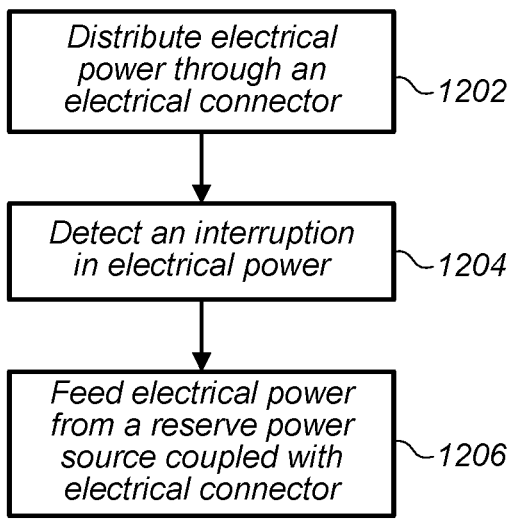
FIG. 12 illustrates a flow chart for providing electrical power to electrical devices connected via an electrical connector with reserve power support, according to some embodiments.

FIG. 12 illustrates a flow chart for providing electrical power to electrical devices connected via an electrical connector with reserve power support, according to some embodiments. At 1202 electrical power is fed from a primary power source to an electrical load, such as computing device, through a cable and one or more electrical connectors that include reserve power support. At 1204, an interruption is detected in electrical power at one or more of the electrical connectors. For example, an electrical connector may have been inadvertently disconnected from a primary power source or a disruption in power in a primary power source may have caused an interruption in power being received at the electrical connector. In some embodiments, an interruption may be detected based on a voltage or current of power received at an electrical connector falling below a threshold voltage or current. In some embodiments, one or more other power characteristics, such as power quality, may be used to determine an interruption in electrical power received from a primary power source. At 1206, in response to detecting an interruption in primary power being received at an electrical connector, electrical power may be fed to one or more loads downstream of the electrical connector from a reserve power source included in the electrical connector, for example embedded in in a casing of the electrical connector, or from a shared external reserve power source coupled with the electrical connector. In some embodiments, additionally an indicator of an electrical connector may provide an indication that electrical power is being fed from a reserve power source associated with the electrical connector. For example, an indicator of an electrical connector may be caused to provide an indication that power is being fed from the reserve power source associated with the electrical connector.

Figure 13:
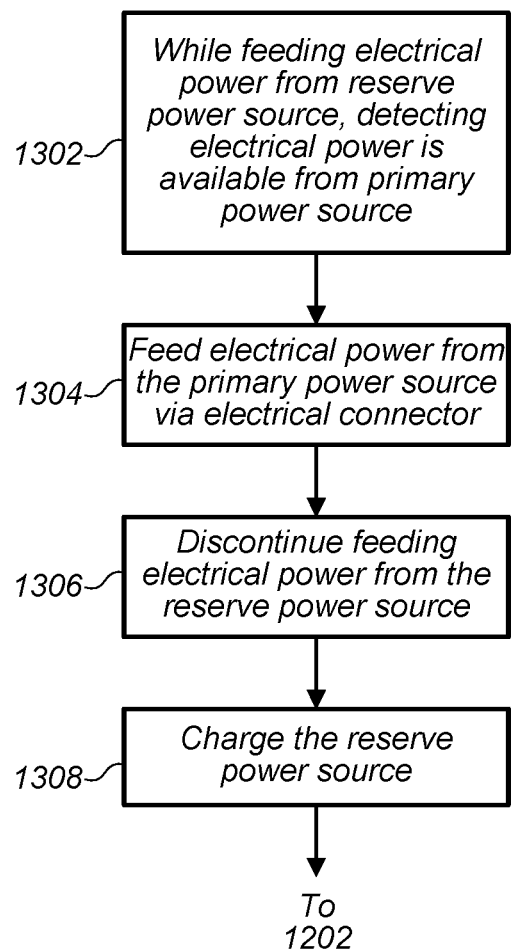
FIG. 13 illustrates a flow chart for providing electrical power to electrical devices connected via an electrical connector with reserve power support, according to some embodiments.

FIG. 13 illustrates a flow chart for providing electrical power to electrical devices connected via an electrical connector with reserve power support, according to some embodiments. At 1302, while feeding electrical power from a reserve power source, for example at or subsequent to 1206, it may be detected that electrical power is available from the primary power source at the electrical connector. For example, a voltage, current, power characteristic, etc. of primary power being received at the electrical connector may meet or exceed one or more thresholds. In response, at 1304, the electrical connector may revert to feeding electrical power to one or more downstream electrical loads from the primary power source and at 1306 may discontinue to feed electrical power from the reserve power source associated with the electrical connector. In addition, at 1308 the electrical connector may charge a reserve power source associated with the electrical connector. In some embodiments, an electrical connector may charge a reserve power source from a portion of primary power received from a primary power source while feeding primary power to one or more downstream electrical loads. Subsequent to 1308, the process may revert back to 1202 and continue to distribute electrical power from the primary power source through the electrical connector to the one or more downstream loads. In some embodiments, detection of an interruption in electrical power and detection of electrical power being restored from a primary power system may be performed passively. For example, a diode may allow power to flow from a reserve power source if a voltage of power from a primary power source falls below a threshold value and may discontinue flow of electrical power from the reserve power source if a voltage of electrical power received from the primary power source exceeds the threshold value. In some embodiments, an electrical connector may include a control circuit that actively measure one or more characteristics of electrical power received from a primary power source and detects a disruption based on the one or more measured characteristics passing a threshold value.

Figure 14:
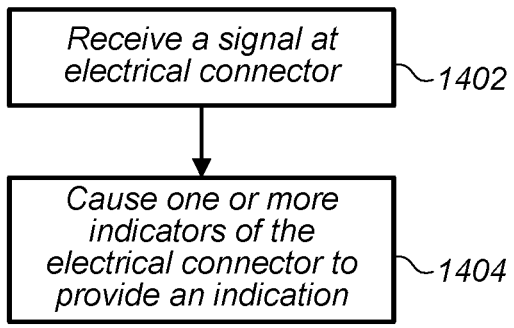
FIG. 14 illustrates a flow chart for providing an indication from an electrical connector, according to some embodiments.

FIG. 14 illustrates a flow chart for providing an indication from an electrical connector, according to some embodiments. At 1402, a signal is received at an electrical connector from an external system. For example the signal may be communicated via a wired connection to the electrical connector such as via port 652 as shown in FIG. 6, via a wireless connection such as in FIG. 7, via a modulated signal over a power connection such as in FIG. 8, or via other suitable communication means.

At 1404 an electrical connector may cause one or more indicators, such as lights or displays, to provide an indication in accordance with the received signal. For example, the indication may cause one or more lights of an electrical connector to flash to indicate a location of the electrical connector.

Figure 15:
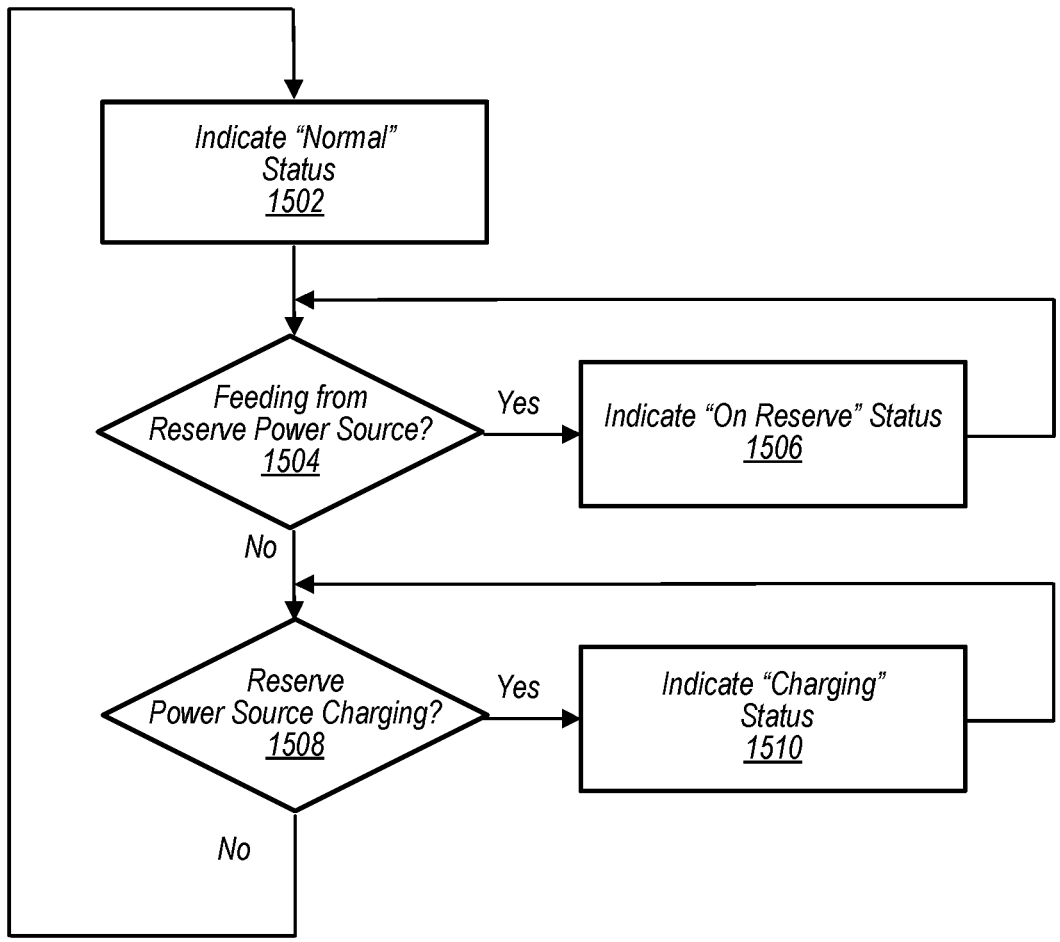
FIG. 15 illustrates a process for determining a status indication to display in an indicator of an electrical connector, according to some embodiments.

FIG. 15 illustrates a process for determining a status indication to display in an indicator of an electrical connector, according to some embodiments.

At 1502 an indicator of an electrical connector indicate a "normal" status of a reserve power source included in the electrical connector. For example, the "normal" status may indicate that the reserve power source is charged. In addition, a "normal" status may further indicate a status of the reserve power source. For example, a "normal" indicator may indicate that the reserve power source is not failed. In some embodiments, a normal status may be indicated by the illumination of a colored light. For example, a green light being illuminated by indicate a "normal" status. In some embodiments, when a reserve power source is in an abnormal state, for example failed, one or more indicators of an electrical connector may provide an indication of the abnormal state, for example the one or more indicators may blink a pattern that indicates the failed state of the reserve power source. In some embodiments, an electrical connector may include a digital display and the display may indicate the text "normal" or an equivalent phrase.

At 1504, it is determined whether power is being fed from the reserve power source. If power is being fed from the reserve power source, an indicator of an electrical connector may indicate a "on reserve" status. For example, a green light may cease to be illuminated and instead a red light may be illuminated. In some embodiments, a digital display may indicate the text "on reserve" or an equivalent phrase. In some embodiments, an indicator may continue to indicate "on reserve" while power is being fed from a reserve power source.

At 1508, in response to determining at 1504 that power is not being fed from the reserve power source, it may further be determined whether the reserve power source is being charged. At 1510, in response to determining the reserve power source is being charged an indicator of an electrical connector may provide a "charging" status indication. For example, the red light of the electrical connector may cease to be illuminated and a yellow light may be illuminated to indicate that the reserve power source is being charged. In some embodiments, an indicator of an electrical connector may include a digital display that may indicate the text "charging" or an equivalent phrase. In some embodiments, an indicator of an electrical connector may further indicate a state, for example if a reserve power source is failing to charge, an indicator may provide a charge failure indication. For example, one or more indicators of an electrical connector may flash in a sequence that indicate a charge failure.

In response to determining at 1508 that a reserve power source is no longer charging and power is not being fed from the reserve power source, the process reverts back to 1502 and indicates a "normal" status. In some embodiments, if a reserve power source fails to charge, the process may not revert back to 1502 and one or more indicators may provide a charge failure indication.

The various methods as illustrated in the Figures and described herein represent exemplary embodiments of methods. The order of methods may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
an electrical power cable comprising a cable portion, an electrical plug, and an electrical receptacle;
wherein the electrical plug is coupled to a supply end of the cable portion, wherein the electrical plug is configured to couple the cable portion to an electrical power source; and
wherein the electrical receptacle is coupled to a load end of the cable portion, wherein the electrical receptacle is configured to accept one or more pins to couple the cable portion to a device configured to receive electrical power;
wherein the electrical plug and the electrical receptacle collectively comprise:
a reserve power source; and
a control circuit configured to automatically provide reserve electrical power to the device from the reserve power source via a second power flow path in response to an interruption in electrical power at the electrical receptacle from the electrical power source via a first power flow path, wherein the control circuit comprises:
the first power flow path between the electrical plug and the electrical receptacle that bypasses the reserve power source; and
the second power flow path that includes the reserve power source.

2. The system of claim 1, wherein the reserve power source comprises a battery, a fuel cell, or a supercapacitor configured to provide electrical power to the device during the interruption.

3. The system of claim 1 further comprising:
an indicator coupled to the electrical plug or the electrical receptacle, wherein the indicator is configured to:
indicate a state or status of the reserve power source; or
in response to receiving a signal from a device external to the electrical plug or the electrical receptacle, provide an indication in accordance with the signal.

4. The system of claim 1, wherein the reserve power source and at least some of components of the control circuit are embedded in different ones of the electrical plug and the electrical receptacle.

5. The system of claim 1, wherein the reserve power source and the control circuit are embedded in the same one of either the electrical plug or the electrical receptacle.

6. A system, comprising:
an electrical connector of an electrical power cable configured to couple with an electrical power source or a device that receives electrical power, wherein the electrical connector comprises:
a plurality of pins configured to couple with receptacle portions of an electrical receptacle connected to the electrical power source, or
a plurality of receptacle portions configured to couple with pins of an electrical plug connected to the device; and
a control circuit, embedded in the electrical connector, the control circuit configured to automatically provide reserve electrical power from a reserve power source via a second power flow path in response to an interruption in the electrical power received at the electrical connector from the electrical power source, wherein the control circuit comprises:
a first power flow path that bypasses the reserve power source and that is configured to provide the electrical power received by the electrical connector from the electrical power source; and
the second power flow path that includes the reserve power source.

7. The system of claim 6, further comprising the reserve power source, wherein the reserve power source is embedded in the electrical connector.

8. The system of claim 6, further comprising an override mechanism configured to cause an element of the control circuit to prevent the reserve electrical power from being fed from the reserve power source during the interruption.

9. The system of claim 6, wherein the reserve power source is external to the electrical connector and is electrically coupled to the electrical connector.

10. The system of claim 6, further comprising:
an indicator coupled with a casing of the electrical connector, wherein the indicator is configured to:
indicate a state or status of the reserve power source; or
in response to receiving a signal, provide an indication in accordance with the signal.

11. The system of claim 10, wherein the indicator is configured to indicate that reserve electrical power is being fed from the reserve power source.

12. The system of claim 10, further comprising:
a network interface embedded in a casing of the electrical connector configured to receive the signal, wherein the signal causes the indicator to provide an indication for identifying the electrical connector from among a set of electrical connectors.

13. The system of claim 12, wherein the network interface is configured to receive wireless communication signals.

14. The system of claim 12, wherein the network interface is configured to receive communication signals communicated over wires that distribute electrical power being received from the electrical power source.

15. The system of claim 6, wherein the electrical connector comprises:
pins or receptacles having a configuration in accordance with an International Electrotechnical Commission (IEC) standard; or
pins or receptacles having a configuration in accordance with a National Electrical Manufacturers Association (NEMA) standard.

16. A method, comprising:
distributing electrical power received at an electrical connector to a downstream device coupled to the electrical connector from an electrical power source coupled to the electrical connector, wherein the electrical connector comprises:
a plurality of pins configured to couple with receptacle portions of an electrical receptacle connected to the electrical power source, or
a plurality of receptacle portions configured to couple with pins of an electrical plug connected to the device; and
a control circuit, embedded in the electrical connector, configured to automatically provide reserve electrical power from a reserve power source in response to an interruption in power received at the electrical connector from the electrical power source, wherein the control circuit comprises:
a first power flow path that bypasses the reserve power source and that is configured to provide the electrical power received by the electrical connector from the electrical power source; and
the second power flow path that includes the reserve power source; and
in response to the interruption in the electrical power received at the electrical connector from the electrical power source and provided by the first power flow path, feeding the reserve electrical power via the second power flow path to the downstream device from the reserve power source included in a casing of the electrical connector or electrically coupled to the electrical connector via a connection separate from the electrical power source.

17. The method of claim 16, further comprising:
indicating, via an indicator coupled to the casing of the electrical connector, that reserve electrical power is being fed from the reserve power source.

18. The method of claim 16, further comprising:
after the interruption in the electrical power received at the electrical connector from the electrical power source, detecting that electrical power from the electrical power source is available to be distributed to the downstream device; and responsive to the detecting, discontinuing to feed reserve electrical power from the reserve power source; and after discontinuing feeding of the reserve electrical power, distributing electrical power from the electrical power source to the downstream device.

19. The method of claim 16, wherein the reserve power source is a battery, a fuel cell, or a supercapacitor.

20. The method of claim 16, further comprising:

receiving a signal at the electrical connector from a source external to the electrical connector; and causing an indicator of the electrical connector to provide an indication in accordance with the signal.

* * * * *